Oct. 8, 1968    H. E. BRANDMAIER    3,405,291
RANKINE CYCLE ELECTROGASDYNAMIC GENERATOR
Filed Oct. 20, 1965
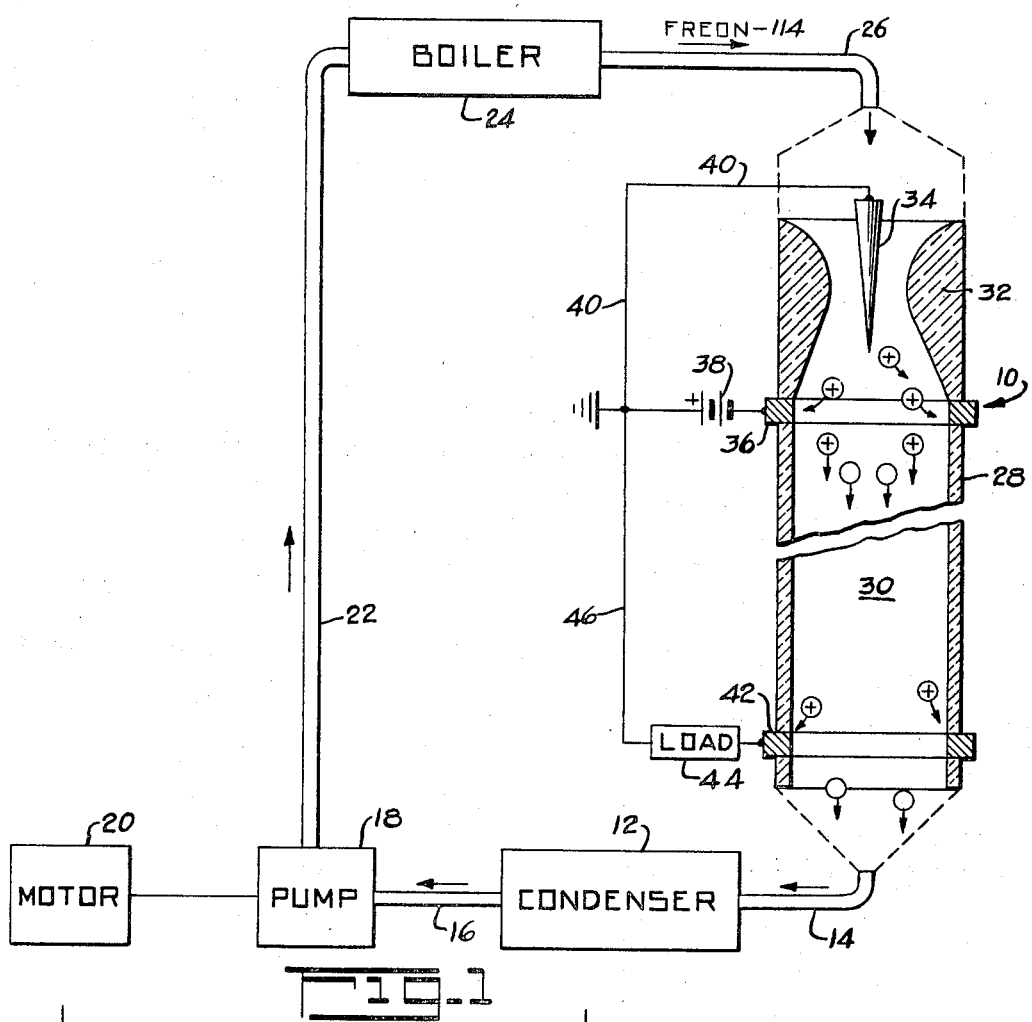
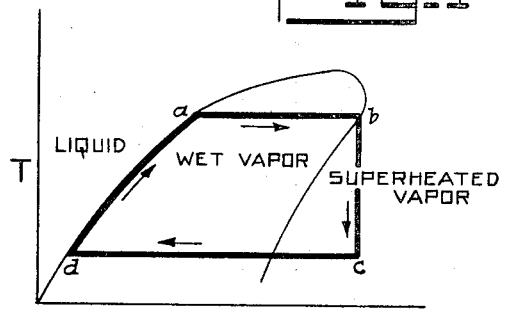
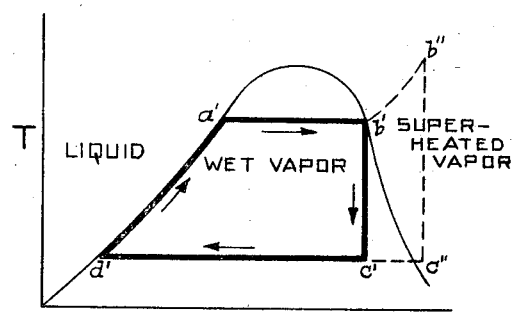
INVENTOR
HAROLD E. BRANDMAIER
BY
Victor D. Behn
ATTORNEY United States Patent Office 3,405,291
Patented Oct. 8, 1968

3,405,291
RANKINE CYCLE ELECTROGAS-
DYNAMIC GENERATOR
Harold E. Brandmaier, Harrington Park, N.J., assignor
to Curtiss-Wright Corporation
Filed Oct. 20, 1965, Ser. No. 498,836
8 Claims. (Cl. 310—10)

This invention relates to electric generators and is more particularly directed to electrogasdynamic generators for the generation of electric power.

In recent years, electrogasdynamic generators have been the subject of considerable development work. It is known that such generators are particularly suited for the generation of high voltages. In comparison to a Van de Graff high voltage generator, an electrogasdynamic generator has numerous advantages. In a Van de Graff generator the electric charges are transported on the surface of a moving belt whereas in an electrogasdynamic generator the electric charges are transported in a volume of a moving gas. Because the velocity of such a gas flow in an electrogasdynamic generator can be made many times the velocity of a moving belt and because in a Van de Graff generator the charges are confined to a moving surface rather than a moving volume, a very much higher charge flow can be achieved in an electrogasdynamic generator for a generator apparatus of given size. This means that for a given power output, an electrogasdynamic generator can be made much smaller, more compact and lighter in weight than a Van de Graff generator, all of which advantages are very significant for space applications. An added advantage of the electrogasdynamic generator is that it is less expensive particularly because of its relative simplicity and absence of moving parts other than a pump for pumping the motive fluid.

Electrohydrodynamic generators are also known. Here the working fluid is a liquid instead of a gas as in electrogasdynamic generators. In an electrohydrodynamic generator the working fluid being a liquid has a very much lower flow velocity than is possible with a gas in an electrogasdynamic generator. Because of this fact, for a given electric power output the electrogasdynamic generator will be much more compact. In addition, because fluid friction is substantially greater in liquid flow as compared to friction in gas flow, the percentage of power loss due to fluid friction in an electrohydrodynamic generator will be much greater than in an electrogasdynamic generator.

Electrogasdynamic generators using steam as the working fluid and operating on the Rankine cycle are also known. Steam however tends to condense on the walls of the generator, thereby causing electric short circuit problems in the generator. Electrogasdynamic generators using a gas or aerosol and operating on the Brayton cycle are also known. The Brayton cycle in general is less efficient than the Rankine cycle and requires a gas pump or compressor for producing the fluid flow. Operation of such a generator on the Rankine cycle is therefore simpler because a liquid instead of a gas pump is used. The use of an aerosol in the Brayton cycle also presents a problem in proper control of the condensation process used to produce the aerosol.

An object of the present invention comprises the provision of a novel method of electric power generation and electrogasdynamic generator apparatus which minimizes the above discussed problems in prior high voltage electric generators. In accordance with the present invention an electrogasdynamic generator is operated on a closed-loop Rankine cycle using a working fluid which has the characteristic that, on isentropic expansion from an initially saturated state, the state of the fluid becomes superheated and remains in this superheated condition throughout the expansion. A fluid having this characteristic is herein termed a "dry-expansion fluid" in contrast to a fluid which, on isentropic expansion from an initially saturated state, becomes a mixture of a liquid and a gas throughout the expansion. Fluids of this latter characteristic are herein termed "wet-expansion fluids." Steam is an example of a wet-expansion fluid.

The method of the present invention comprises pressurizing a dry-expansion type fluid while the fluid is in the liquid state, heating the pressurized fluid to a saturated state, substantially isentropically expanding said fluid, electrically charging the fluid and causing the ions of the charged fluid to flow against an electric field to generate electric energy, condensing the fluid and continuously repeating the cycle. Preferably the working fluid is one having a boiling temperature below 70° F. at sea level atmospheric pressure.

Another advantages of the present invention over Rankine cycle electrogasdynamic generators utilizing steam as the working fluid is that steam has a higher drift velocity or mobility than dry-expansion fluids and therefore the decrease in the rate of flow of the electric charges because of the drift velocity factor is less with generators of the present invention.

Other objects of the invention will become apparent upon reading the annexed detailed description in connection with the drawings in which:

FIG. 1 is a schematic view of an electrogasdynamic generator system operating on the Rankine cycle and embodying the invention;

FIG. 2 is a temperature-entropy diagram for a dry-expansion type working fluid, such as Freon-114, utilized in the Rankine cycle system of FIG. 1 and illustrating the Rankine cycle of the working fluid in heavy lines and, in lighter weight lines, the boundary limits of the different states of the fluid, i.e. liquid, wet vapor and superheated vapor; and FIG. 3 is a diagram similar to FIG. 2 for a wet-expansion type working fluid such as steam and not forming part of the invention.

Referring first to FIG. 1 of the drawing, there is illustrated an electrogasdynamic generator 10 utilizing Freon-114 as the working fluid, said generator forming part of apparatus for operation of the working fluid through a closed-loop Rankine cycle process. The remainder of said apparatus includes a condenser 12 and a flow passage 14 connecting the motive fluid outlet of the generator 10 with the inlet of the condenser. On discharging from the generator 10 the working fluid is in the gaseous state. The condenser 12 extracts heat from the working fluid to return it to the liquid state.

From the condenser 12 the working fluid, in the liquid state, flows through the condenser outlet passage 16 to a pump 18 driven by a motor 20. The pump returns the liquid working fluid under pressure through a passage 22 to a boiler 24. The boiler adds sufficient heat to the pressurized working fluid to raise its temperature so that the fluid attains a saturated vapor condition. From the boiler, the working fluid in its high pressure and saturated vapor condition is supplied to the electrogasdynamic generator by the passage 26. The condenser 12, pump 18, motor 20 and boiler 24 are conventional elements of Rankine cycle apparatus.

As illustrated, the electrogasdynamic generator 10 comprises a tubular outer-wall portion 28 forming a flow passage 30 for the working fluid and having an inlet nozzle 32. The tubular wall 28 is of a material having a high electrical insulating property. This nozzle 32 is shown as having a convergent-divergent profile for accelerating the motive fluid in its convergent region to sonic velocity at the nozzle throat and then in the divergent region, further accelerating the motive fluid into the supersonic flow range.

In order to electrically charge the working gaseous fluid a needle-shaped electrode 34 is coaxially disposed within the nozzle 32 with the pointed end of the needle disposed in the region of the discharge end of the nozzle 32. A second electrode 36 of annular construction is disposed in the tubular wall 28 at the discharge end of the nozzle 32 so as to be exposed to flow of the working fluid thereover and an electric voltage source 38 is connected across the electrodes 34 and 36 to provide a corona-type electric discharge between said electrodes across the working fluid passage 30 for electrically charging the working fluid.

As illustrated, the electric voltage source 38 is connected by circuit connection 40 so that the needle electrode 34 is at a positive potential relative to the electrode 36. As a result, the free electrons in the electrically charged gaseous fluid are attracted to the needle electrode 34 and the positive ions are attracted toward the annular electrode 36. In electrogasdynamic generators the annular electrode 36 is generally termed the attractor electrode.

Because of their relatively large mass, compared to that of electrons, the ions in the working fluid have relatively low mobility, particularly as compared to that of the flow velocity of the gaseous working fluid through the passage 30. As a result, only a small percentage of the ions reach the attractor electrode 36, the majority of said ions being swept past the electrode 36 by the fast moving working fluid and therefore only a small current flows through the attractor electrode. The free electrons, however, because of their very high mobility, reach the needle electrode and therefore the working fluid in the passage 30 downstream of the attractor electrode 36 is primarily a mixture of neutral molecules of gaseous working fluid and positive ions of said gas molecules.

In FIG. 1, typical neutral gas molecules are indicated in the electrogasdynamic generator passage 30 by small circles and typical positive ions are each indicated by small circle with a positive (plus) mark in the middle of the circle.

Downstream of the annular attractor electrode 36 is a second annular electrode 42 also disposed in the tubular wall 28 so as to be exposed to flow of the working fluid thereover. The second electrode 42 is generally termed the collector electrode and is connected through a suitable load 44 to the voltage source 38 by a circuit connection 46. As a result of the radial electric field produced by the positive ions in the working fluid, said ions drift radially outward toward the wall of the passage 30 and contact the collector electrode 42 where they are neutralized by the electrons in the circuit, thereby producing on electric current flow through the load 44. The portion of the electrogasdynamic generator between the attractor electrode 36 and the collector electrode 42 is known as the conversion section of the generator.

Electrogasdynamic generator apparatus such as the apparatus 10 is well known and is capable of generating electric power outputs of high voltage. The electric energy is obtained by conversion of energy from the working fluid as a result of flow of the ions in the flow passage 30 from the region of the attractor electrode to the collector electrode against the electric field or space charge created by said ions. As a result of collisions between the neutral molecules and the ions, the flow of the neutral molecules of the gas in this conversion section of the generator in effect drags the ions along against said electric field.

With the voltage source 38 connected, as illustrated, such that the needle electrode 34 has a positive electric potential relative to that of the attractor electrode 36, positive ions are provided in the working fluid in the conversion section of the generator. The voltage source may, however, be connected in the reverse manner so that the needle electrode 34 is now negative relative to that of the attractor electrode. With this latter arrangement the corona discharge from the needle electrode 34 is effective to produce negative ions in the gas stream in the conversion section of the generator. In lieu of a corona discharge, it is within the scope of this invention to utilize other means for electrically charging the gaseous working fluid.

In the case of certain fluids, if the fluid is expanded isentropically from an initially saturated state, the fluid expands into the superheated region of the fluid. As already stated, such a fluid is herein termed a dry-expansion type fluid and the present invention is limited to this latter type of fluid. A typical Rankine cycle for a dry-expansion type fluid is shown, in heavy lines, by the temperature (T)-entropy (S) diagram of FIG. 2 in which the Rankine cycle is superimposed on the liquid, wet vapor and vapor boundary limits of the fluid shown by a relatively lightweight line. With the Rankine cycle of FIG. 2, heating of the high pressure fluid from an initial boiling state to a saturated state is shown by the line $ab$, expansion from the saturated state by the line $bc$, condensation by the line $cd$ and pressurization and heating to the desired pressure and boiling temperature by the line $da$.

As is evident from FIG. 2, expansion of the fluid along the line $bc$ is in the superheated region and therefore no condensation of the fluid takes place during the expansion. This is in contrast to expansion of most fluids from a saturated state. Thus most fluids, including steam, become a mixture of liquid and gas upon isentropic expansion from an initially saturated state. As already stated, any such latter fluid is herein termed a wet-expansion type fluid and such fluids form no part of the present invention. A typical Rankine cycle, temperature (T)-entropy (S) diagram for a wet-expansion type fluid is shown in FIG. 3 superimposed again on the liquid, wet vapor and superheated vapor boundary limits of the fluid shown in relatively lightweight lines. The various phases of the cycle shown by the lines $a'b'$, $b'c'$, $c'd'$ and $d'a'$ correspond to the phases $ab$, $bc$, $cd$ and $da$ respectively of FIG. 2.

As is evident from FIG. 3, if a wet-expansion fluid is used, condensation will take place upon expansion from point $b'$. Accordingly if such a fluid were used in the system of FIG. 1, condensation would take place on the walls of the passage 30 thereby tending to produce an electric short circuit.

If a wet-expansion fluid were used in the system of FIG. 1, such condensation and wetting of the walls of the passage 30 could at least be minimized if the fluid were superheated before expansion, for example, as shown by the dashed line $b'b''$ in FIG. 3 and then expanded along the line $b''c''$. With this degree of superheat, the fluid upon expansion along the line $b''c''$ remains in the superheat region and therefore no condensation takes place in the expansion phase. However, superheating the fluid substantially reduces the efficiency of the Rankine cycle and in addition, if condensation is to be avoided, the magnitude of the superheating must be sufficient. Any lesser superheating than that illustrated in FIG. 3 would still result in some condensation of the working fluid upon expansion to the temperature of line $c'd'$.

Typical dry-expansion fluids include sulfur, aluminum bromide, diphenyl, Dowtherm A, some hydrocarbons and the Freons. Freon-114 in particular has the further advantageous property that, at atmospheric pressure, its boiling point temperature (38.8° F.) is below normal ambient temperature, that is below about 70° F. Other dry-expansion type fluids including other Freons also have this property.

As a typical example using Freon-114 as the motive fluid in the system of FIG. 1, the working fluid is pressurized by pump 18 to 280 pounds per square inch absolute (p.s.i.a.) and is heated to 700° R. (240° F.), its boiling point at this pressure, until the working fluid is in a saturated state (point $b$ in FIG. 2). The working fluid is then expanded through the nozzle 32 to a pressure of 14 p.s.i.a. and 496° R. (36° F.). This results in the working fluid having a flow velocity, at the discharge end of the nozzle, corresponding to a Mach number of approximately 2.5. With this arrangement and operating in an ambient atmosphere of about 70° F., the temperature of the working fluid in the passage 30 downstream of the nozzle 32 is below the ambient temperature and therefore there is no tendency for the working fluid to condense on the wall of passage 30 as would be the case if the ambient temperature and therefore the wall temperature were below that of the working fluid temperature in the passage. Other Freons also have boiling temperatures below 70° F. at sea level atmospheric pressure. In outer space where the ambient temperature is approximately 0° R., the temperature of all working fluids in the conversion section of the electrogasdynamic generator would be higher than said outer space ambient temperature. Such Freons, however, because of their lower operating temperatures in the passage 30, will perform better in outer space, that is, with less condensation and with less radiation of heat to walls of said passage.

With Freon-114 as the working fluid under the conditions described and with the electrodes 34 and 36 having a spacing of about ¼ inch, it has been found that a voltage of about 5,000–20,000 volts across said electrodes provides a satisfactory corona discharge for electrically charging the working fluid. However, the particular manner of electrically charging the working fluid does not form part of the present invention.

Although the invention has been described above in a preferred embodiment, it will be understood that various changes and modifications may be made by one skilled in the art without departing from the scope of the invention. It is intended to cover all such modifications in the appended claims.

What is claimed is:

1. Apparatus for generating electric energy comprising a dry-expansion motive fluid, and means providing a closed-loop Rankine cycle operation for said motive fluid and including an electrogasdynamic generator through which said fluid after expansion is caused to flow for generating electric power.

2. Apparatus as claimed in claim 1 and in which said means includes heating means for heating said fluid to a saturated state and includes nozzle means for expanding said fluid from said saturated state into a superheated state.

3. Apparatus as claimed in claim 2 and in which said fluid comprises a Freon.

4. Apparatus as claimed in claim 2 and in which said fluid comprises Freon-114.

5. Apparatus as claimed in claim 2 in which the fluid is expanded to a temperature below ambient temperature.

6. Apparatus as claimed in claim 2 in which the fluid has a boiling temperature of less than 70° F. at sea level atmospheric pressure.

7. The method of generating electric energy by a cyclical operation comprising the steps of pressurizing, in the liquid state, a dry-expansion type fluid; heating said pressurized fluid to a saturated state; expanding the saturated fluid to a superheated condition; electrically charging said expanded fluid; and causing said charged fluid to flow against an electric field to produce electric energy.

8. The method recited in claim 7 and in which said dry-expansion type fluid has a boiling temperature of less than 70° F. at sea level atmospheric pressure and in which said fluid is expanded to approximately sea level atmospheric pressure.

References Cited

UNITED STATES PATENTS 3,225,225  12/1965  Wattendorf _____ 310—6
3,297,887  1/1967   Marks _____ 310—4

MILTON O. HIRSHFIELD, *Primary Examiner.*

DAVID X. SLINEY, *Assistant Examiner.*